US006937561B2

United States Patent
Chiussi et al.

(10) Patent No.: US 6,937,561 B2
(45) Date of Patent: Aug. 30, 2005

(54) METHOD AND APPARATUS FOR GUARANTEEING DATA TRANSFER RATES AND ENFORCING CONFORMANCE WITH TRAFFIC PROFILES IN A PACKET NETWORK

(75) Inventors: Fabio M. Chiussi, Long Branch, NJ (US); Andrea Francini, Middletown, NJ (US)

(73) Assignee: Agere Systems Inc., Allentown, PA (US)

( * ) Notice: Subject to any disclaimer, the term of this patent is extended or adjusted under 35 U.S.C. 154(b) by 920 days.

(21) Appl. No.: 09/873,524

(22) Filed: Jun. 4, 2001

(65) Prior Publication Data

US 2002/0036984 A1 Mar. 28, 2002

Related U.S. Application Data

(60) Provisional application No. 60/208,755, filed on Jun. 2, 2000.

(51) Int. Cl.[7] .............................................. G08C 15/00
(52) U.S. Cl. ....................................... 370/229; 370/412
(58) Field of Search .............................. 370/229, 230.1, 370/231, 232, 233, 234, 235, 235.1, 412, 413, 389, 468

(56) References Cited

U.S. PATENT DOCUMENTS

| | | | | |
|---|---|---|---|---|
| 5,796,719 A | * | 8/1998 | Peris et al. | 370/231 |
| 5,946,297 A | * | 8/1999 | Calvignac et al. | 370/230 |
| 5,974,033 A | | 10/1999 | Kamiya et al. | |
| 6,011,775 A | | 1/2000 | Bonomi et al. | |
| 6,018,527 A | * | 1/2000 | Yin et al. | 370/395.41 |
| 6,064,650 A | | 5/2000 | Kappler et al. | |
| 6,075,791 A | | 6/2000 | Chiussi et al. | |
| 6,091,708 A | | 7/2000 | Matsunuma | |
| 6,097,701 A | | 8/2000 | Grünenfelder et al. | |
| 6,154,459 A | | 11/2000 | Wicklund | |
| 6,185,188 B1 | | 2/2001 | Hasegawa | |
| 6,215,767 B1 | | 4/2001 | Li | |
| 6,229,788 B1 | | 5/2001 | Graves et al. | |
| 6,452,933 B1 | * | 9/2002 | Duffield et al. | 370/415 |
| 2002/0036984 A1 | * | 3/2002 | Chiussi et al. | 370/232 |

OTHER PUBLICATIONS

Jennifer Rexford, Flavio Bonomi, Albert Greenberg, Albert Wong, "Scalable Architectures for Integrated Traffic Shaping and Link Scheduling in High–Speed ATM Switches".
H. Jonathan Chao, Jun S. Hong, "Design of an ATM Shaping Multiplexer With Guaranteed Output Burstiness", Dept. of Electrical Engineering, Brooklyn, New York, Aug. 28, 1996.
Dimitrios Stiliadis, Anujan Varma, "A General Methodology for Designing Efficient Traffic Scheduling and Shaping Algorithms", 1997 IEEE.

* cited by examiner

Primary Examiner—Kwang Bin Yao
Assistant Examiner—Keith M. George

(57) ABSTRACT

A monolithic shaper-scheduler is used for the efficient integration of scheduling and dual-leaky-bucket shaping in a single structure. By making the evolution of the timestamps of the backlogged flows independent of their shaping parameters, the performance drawbacks of prior-art shaping architectures are overcome. The monolithic shaper-scheduler tests each packet flow as being either "virtually compliant" or "virtually incompliant" when a new packet arrives to the head of its queue. The test for "virtual compliance" is based on traffic profiles associated with the flows. The result of the test is used in conjunction with the timestamp and eligibility flag of each packet flow to efficiently schedule the transmission of packets.

20 Claims, 9 Drawing Sheets

SHAPED FLOW $f_i$

UNSHAPED FLOW $f_j$

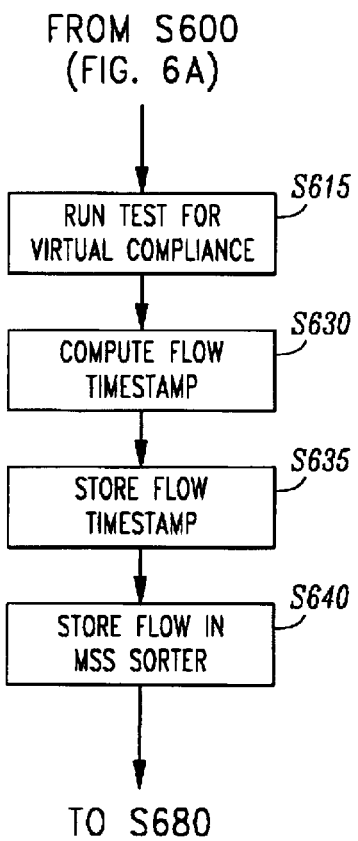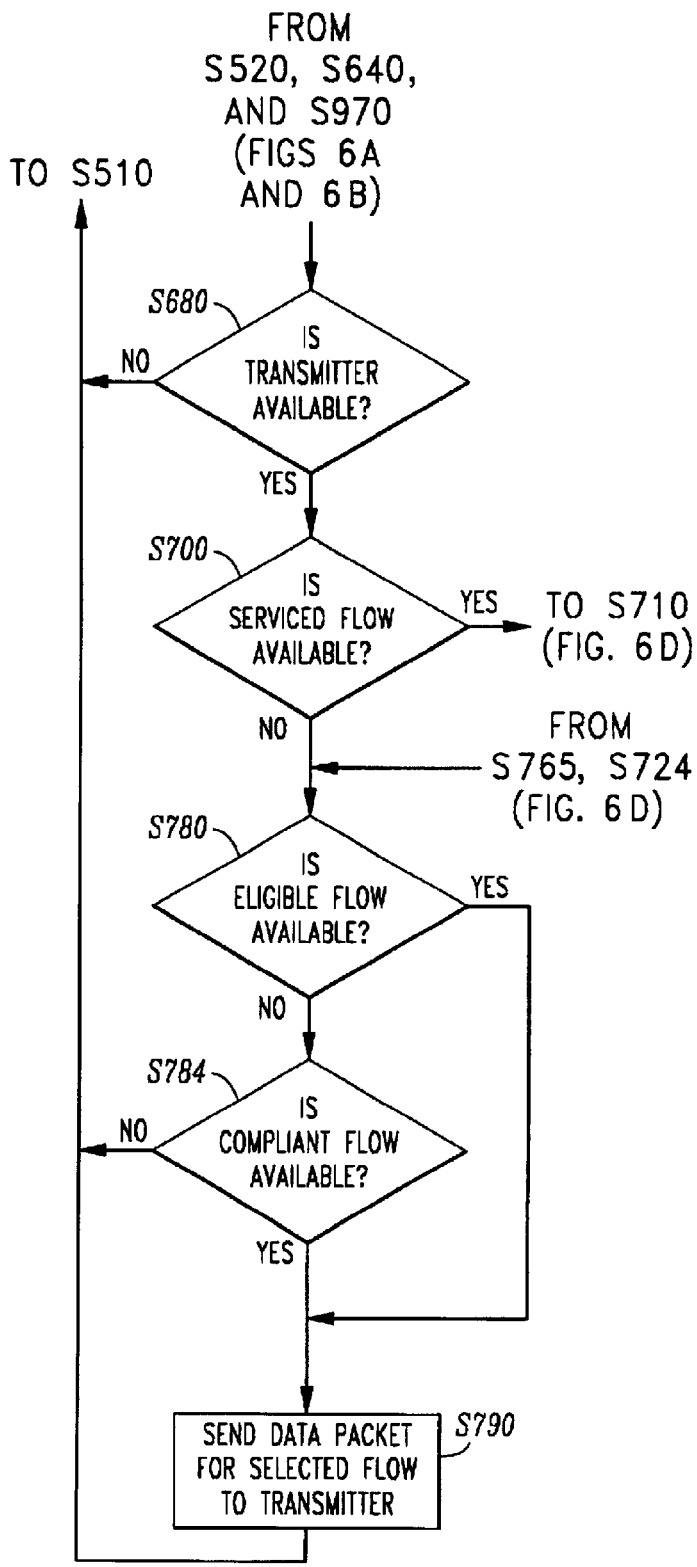
FIG. 6B
FIG. 6C

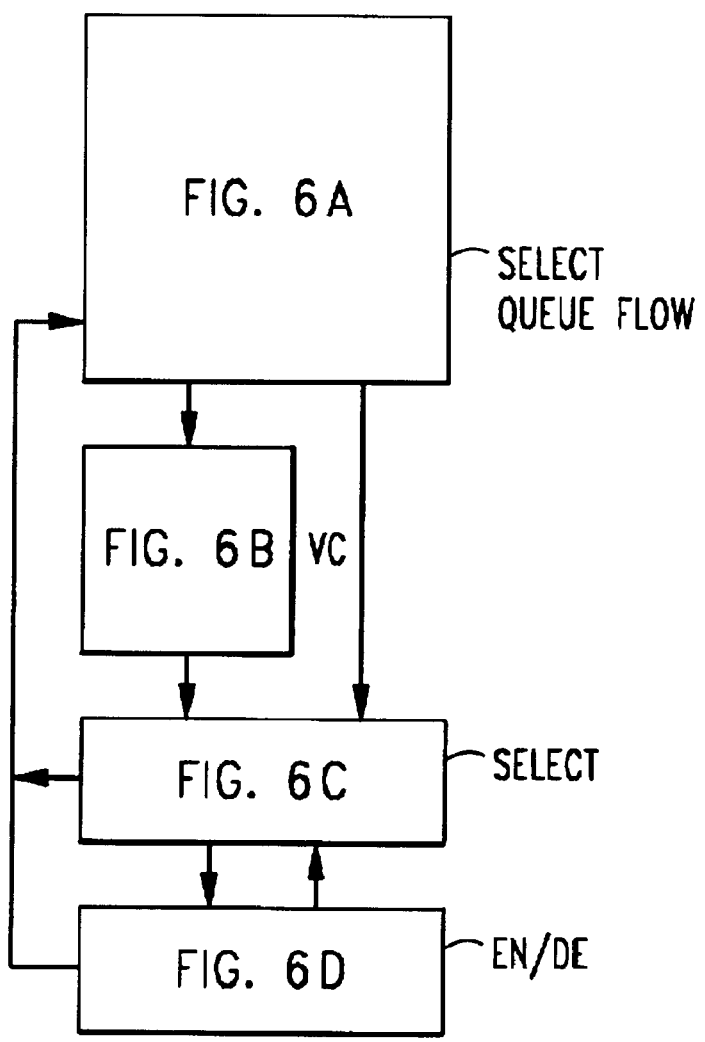

METHOD AND APPARATUS FOR GUARANTEEING DATA TRANSFER RATES AND ENFORCING CONFORMANCE WITH TRAFFIC PROFILES IN A PACKET NETWORK

CROSS-REFERENCE TO RELATED APPLICATION

This application claims the priority of Provisional Application No. 60/208,755, filed Jun. 2, 2000.

TECHNICAL FIELD

The present invention relates to a system for scheduling data packet transmissions in a packet communication network and, more particularly, to utilizing parameters associated with bandwidth guarantees and traffic profiles of network connections to prioritize and manage the transmission of data packets.

BACKGROUND OF THE INVENTION

The provision of negotiated Quality-of-Service (QoS) guarantees such as data transfer rate and data transfer delay to traffic generated by applications of widely different characteristics is a primary objective in packet networks. In such networks, when network resources such as communication links are shared among a plurality of network connections (also referred to as "flows"), sophisticated packet scheduling disciplines are necessary to satisfy the QoS requirements of network connections that are bandwidth- and delay-sensitive. A server in a communication system providing such QoS guarantees typically employs multiple queues, in which each queue is associated with a corresponding network connection, and uses a scheduling algorithm to control the order in which the individual queues are served.

One such sophisticated scheduling algorithm is the Generalized Processor Sharing (GPS) scheduling policy. GPS is an idealized scheme which guarantees a negotiated minimum data transfer rate to each network connection, regardless of the behavior of other connections. GPS also guarantees a negotiated maximum end-to-end data transfer delay to each connection, and ensures that all connections are served in a fair manner. During any time interval, a GPS server serves all backlogged queues, i.e., queues which have packets waiting to be transmitted, simultaneously, each with an instantaneous service rate and delay associated with the respective connection. It can be appreciated that since all connections have to be serviced simultaneously, the GPS algorithm cannot be implemented in a real-world packet network, and, therefore, is considered to be more of an ideal scheduling discipline.

A class of scheduling disciplines, called GPS-related packet schedulers, approximate the GPS scheduling policy to a certain degree and can therefore be implemented in an actual packet network. These algorithms are all based on maintaining a global function, referred to as "virtual time" or "system potential", which is a measure of the amount of service that has been provided by a server. A server uses this global function to compute a "finishing virtual time", also referred to as a "timestamp", for each packet in the associated system. In this case, the timestamp is indicative of when the service of the corresponding packet should be completed. The server selects the packets for transmission based on the values of their respective timestamps, starting with the smallest value. The GPS-related packet-scheduling disciplines differ from one another in the specific function used as "virtual time". Similarly to GPS, all of the GPS-related packet-scheduling disciplines provide a negotiated minimum data transfer rate to each network connection. The specific virtual-time function that is used by each of such disciplines determines the implementation complexity of the algorithm, the value of the maximum data transfer delay that the algorithm can provide to a connection, and whether or not the algorithm serves all connections in a fair manner. An algorithm that is of minimum complexity, provides a small value of the maximum data transfer delay to each connection, and serves all connections fairly, is highly desirable.

Further, traffic shaping has begun to gain considerable attention as a key component in the deployment of any of the emerging QoS frameworks for packet networks. In particular, a "traffic shaper" can be defined as a device that delays some or all of the packets in a traffic stream in order to bring the stream into compliance with a predetermined traffic profile (the traffic profile of a packet flow expresses the maximum amount of service that the flow is allowed to receive during a given time interval). Traffic shapers play a prominent role in the traffic conditioners that are located at the boundaries of contiguous network domains. In order to prevent a packet stream (i.e., a packet flow) from being heavily policed when entering a new domain, the egress node of the originating domain utilizes a "traffic shaper" to constrain the flow to remain within the negotiated profile.

A critical issue that remains to be solved for the effective deployment of traffic shaping in actual network nodes is the integration of "per-flow" traffic regulators in a scheduler that provides strict individual bandwidth guarantees, while also distributing access to the outgoing link of a packet multiplexer. The objective of such an integrated shaping-scheduling structure is the simultaneous enforcement of robust lower and upper bounds on the amount of service distributed to the individual flows, with upper bounds that can be either finite (for "shaped" flows) or infinite (for "unshaped" flows). The provision of "delay guarantees" on a packet-by-packet basis is not considered to be an objective, since a shaper typically operates in a context where the arrival patterns of the multiplexed flows are poorly regulated, and it is well-known that no packet-delay guarantees can be sustained for a multitude of flows that are not themselves regulated at their sources. However, the achievement of minimal latency and optimal worst-case fairness—on a per-flow basis—remains a major objective, since these properties contribute to the smoothness of the service patterns generated by the shaper.

One exemplary traffic shaper model, which will be used during the course of the description of the present invention, is defined as a "dual-leaky-bucket regulator". A dual-leaky-bucket regulator consists of two components: (1) a Sustainable-Bit-Rate (SBR) leaky bucket, which constrains the long-term behavior of the shaped flow; and (2) a Peak-Bit-Rate (PBR) leaky bucket, which imposes a bound on the transmission rate of the flow during its bursts of activity. The SBR leaky bucket associated with a generic flow $f_l$ is specified by two parameters: a "bucket size" $B_{l,s}$ and a "token rate" $\rho_{l,s}$. Similarly, the PBR leaky bucket associated with flow $f_l$ is also defined by a bucket size $B_{l,p}$ and a token rate of $\rho_{l,p}$. According to the one of the available definitions of the leaky-bucket regulator, the leaky bucket remains empty when the transmission rate of the flow is persistently below the token rate, whereas an increase in the activity of the flow implies the accumulation of tokens in the bucket. When the amount of accumulated tokens hits the bucket size, the regulator forces the transmission rate of the flow to be equal to the token rate.

Flow $f_l$ maintains two state variables associated with the SBR leaky-bucket regulator: a "token level" $X_{l,s}$, which represents the number of tokens currently in use for the flow, and a "time of latest update" $\tau_{l,s}$, which is set to the time when the state of the leaky bucket was last updated. Similar state variables $X_{l,p}$ and $\tau_{l,p}$ are associated with the PBR leaky bucket. Indeed, since both leaky buckets always have their states updated at the same time, we can define $\tau_{l,s} = \tau_{l,p} = \tau_l$. It should be noted that "tokens" are defined as time units, as used in expressing both the bucket size and the token level.

Two distinct events trigger the update of the state of a leaky bucket associated with flow $f_l$: (1) the arrival of a packet when the flow queue is empty, and (2) the transmission of a packet. With respect to the arrival of a packet to an empty queue, consider a time $t_{l,a}{}^k$, when a packet $p_l{}^k$ arrives to the system and finds the corresponding flow $f_l$ idle. Then, the above-defined state variables are updated as follows:

$X_{l,s} = \max(0, X_{l,s} - (t_{l,a}{}^k - \tau_l))$ $X_{l,p} = \max(0, X_{l,p} - (t_{l,a}{}^k - \tau_l))$ $\tau_l = t_{l,a}{}^k$ Regarding the completion of a packet transmission, consider a time $t_{l,d}{}^k$ when the server completes the transmission of a packet $p_l{}^k$. At time $t_{l,d}{}^k$, the state variables are processed as follows:

$X_{l,s} = \max(0, X_{l,s} - (t_{l,d}{}^k - \tau_l)) + l_l{}^k / \rho_{l,s}$ $X_{l,p} = \max(0, X_{l,p} - (t_{l,d}{}^k - \tau_l)) + l_l{}^k / \rho_{l,p}$ $\tau_l = t_{l,d}{}^k$ where $l_l{}^k$ is defined as the length of the just-transmitted packet.

Integrated shaping-scheduling architectures are available in the prior art, but they either fail in satisfying the bandwidth requirements or the shaping constraints of the scheduled flows, or waste a considerable portion of the capacity of the outgoing link. In particular, the well-known Shaped Virtual Clock (Sh-VC) algorithm provides minimum-bandwidth and latency guarantees, and complies with the dual-leaky-bucket profiles of the configured flows. However, it cannot differentiate its shaping action on a per-flow basis, and typically suffers considerable loss of aggregate throughput under common traffic scenarios. Like any other GPS-related scheduler, the Sh-VC algorithm maintains per-flow timestamps to determine the order of transmission of packets. In particular, a flow $f_l$ that has become backlogged at time $t_{l,a}{}^k$, upon arrival of its k-th packet $p_l{}^k$ of length $l_l{}^k$ receives a new timestamp $F_l{}^k$ based upon the following rule:

$$F_l^k = \max(t_{l,a}^k, F_l^{k-1}) + \frac{l_l^k}{r_l}$$

where $r_l$ is defined as the "reserved service rate" of flow $f_l$, and $F_l{}^0 = 0$.

The Sh-VC algorithm implements the Smallest Eligible Finishing time First (SEFF) packet selection policy. That is, at any time $t_s$ when the server is available for the transmission of a new packet, the scheduler looks for the backlogged flow with the minimum "eligible" timestamp $F_e{}^{min}$, which is defined as follows:

$$F_e^{\min} = \min_{j \in B(t_s)} \left\{ F_j \quad s.t. \quad F_j - \frac{l_j}{r_j} \leq t_s \right\}$$

where $B(t_s)$ is the set of flows that are backlogged at time $t_s$. At time $t_{l,n}{}^{k+1}$, when the transmission of packet $p_l{}^k$ is completed and packet $p_l{}^{k+1}$ reaches the head of the queue, the new timestamp of flow $f_l$ is computed as:

$$F_l^{k+1} = F_l^k + \frac{l_l^{k+1}}{r_l}$$

Since in Sh-VC the eligibility condition is determined by the constant-rate growth of the real time t, which is independent of the evolution of the set of timestamps in the system, it is possible to have intervals of time during which no flow is "eligible" for service, so that the server remains idle. The Sh-VC scheduler is therefore non-work-conserving in principle, and shapes the individual flows at exactly their reserved service rates, independently of the associated leaky-bucket parameters. It follows that flows that are far from violating their traffic profiles keep being serviced at their minimum guaranteed rates, and the server may happen to stay idle even if "conforming" traffic is available in the flow queues. This is particularly problematic for unshaped flows, which instead should always experience work-conserving treatment.

Thus, a need remains in the art for a system that defines the order of data packet transmissions in a packet network according to parameters that are associated with both the enforcement of traffic profiles through traffic shaping and the provision of QoS guarantees through traffic scheduling.

SUMMARY OF THE INVENTION

The need remaining in the prior art is addressed by the present invention, which relates to a system for scheduling data packet transmissions in a packet communication network and, more particularly, to utilizing parameters associated with bandwidth guarantees and traffic profiles of network connections to prioritize and manage the transmission of data packets.

In accordance with the inventive technique, denoted as a "monolithic shaper-scheduler" (MSS), the same bandwidth guarantees as a GPS-related scheduler are enforced, while at the same time imposing compliance with the traffic profiles of the individual flows. That is, the amount of service that each flow receives is constrained between a lower bound (set by the guaranteed data transfer rate) and a disjoint upper bound (set by the traffic profile). The upper bound may be infinite (i.e., unshaped traffic), thus the MSS allows multiplexing of shaped and unshaped flows. The scheduler supports minimum-bandwidth and latency guarantees under any schedulable traffic scenario. The traffic regulators control the behavior of the scheduler on a per-flow basis; they keep it "work-conserving" for both unshaped flows and flows that are shaped but are far from violating their profiles. The latency and fairness properties of the MSS are optimal among GPS-related schedulers.

It is an advantage of the system of the present invention that a single sorting structure is used for both shaping and scheduling, processing a set of homogeneous timestamps. In particular, the monolithic shaper-scheduler uses the status of a traffic regulator associated with a flow to determine the scheduling behavior (work-conserving vs. non-work-conserving) that the flow will experience in the immediate future.

In accordance with a preferred embodiment of the present invention, per-flow dual-leaky bucket regulators are used to form the profile of each shaped flow. The Sh-VC scheduler (taken from the prior art) is then modified in accordance with the present invention to accommodate both shaped and unshaped traffic.

A preferred embodiment of the present invention is implemented utilizing a two-dimensional calendar queue (TCQ), which consists of a set of G calendar queues, each calendar queue being an array of b bins. Each bin is associated with a certain range of timestamp values: the "width" of the timestamp range is defined as the "bin granularity", while the lower end of the timestamp range is defined as the "representative timestamp" of the bin. In accordance with the present invention, distinct calendar queues are used to segregate flows whose head-of-the-queue packets have different "service intervals" (the service interval $\Phi_I^k$ of a packet $p_I^k$ is defined as the ratio between the size $l_I^k$ of the packet and the guaranteed service rate $r_I$ of the corresponding flow $f_I$: $\Phi_I^k = l_I^k/r_I$.

Other and further advantages of the present invention will become apparent during the course of the following discussion and by reference to the accompanying drawings.

BRIEF DESCRIPTION OF THE DRAWINGS

Referring now to the drawings,

FIGS. 6A–6D illustrate, in flowchart form, a method for scheduling transmission of data packets, in accordance with the present invention;

FIG. 7 illustrates the particular interconnection of FIGS. 6A, 6B, 6C and 6D.

DETAILED DESCRIPTION

Figure 1:
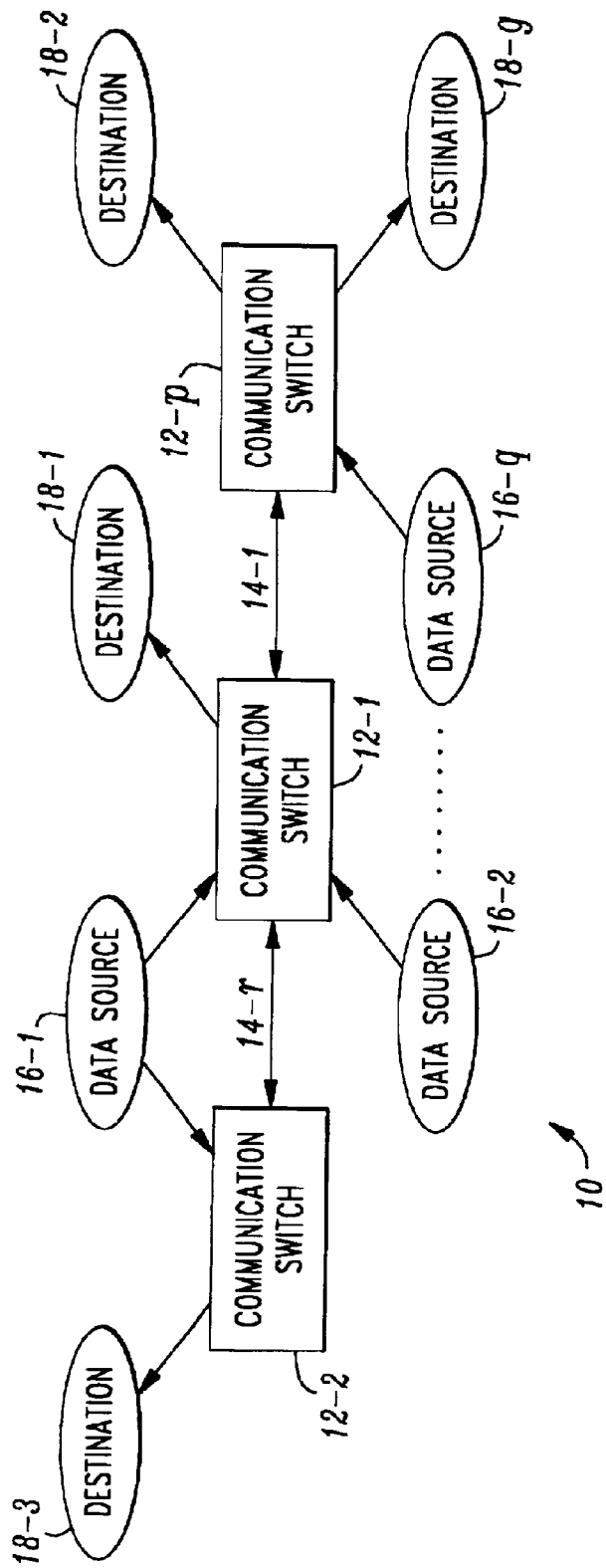
FIG. 1 illustrates a packet network in which a number of switches, data sources, and destinations are connected.

FIG. 1 illustrates, in simplified form, a packet network 10 in which a plurality of switches 12-1 through 12-p are connected to each other by communication links 14-1 through 14-r. A number of data sources 16-1 through 16-q are connected as shown to switches 12-1–12-p. Network connections are established from each of the data sources 16-1 through 16-q to corresponding destinations 18-1 through 18-g by means of communication switches 12-1 through 12-p, and data packets are transmitted from each data source to the corresponding destination.

Figure 2:
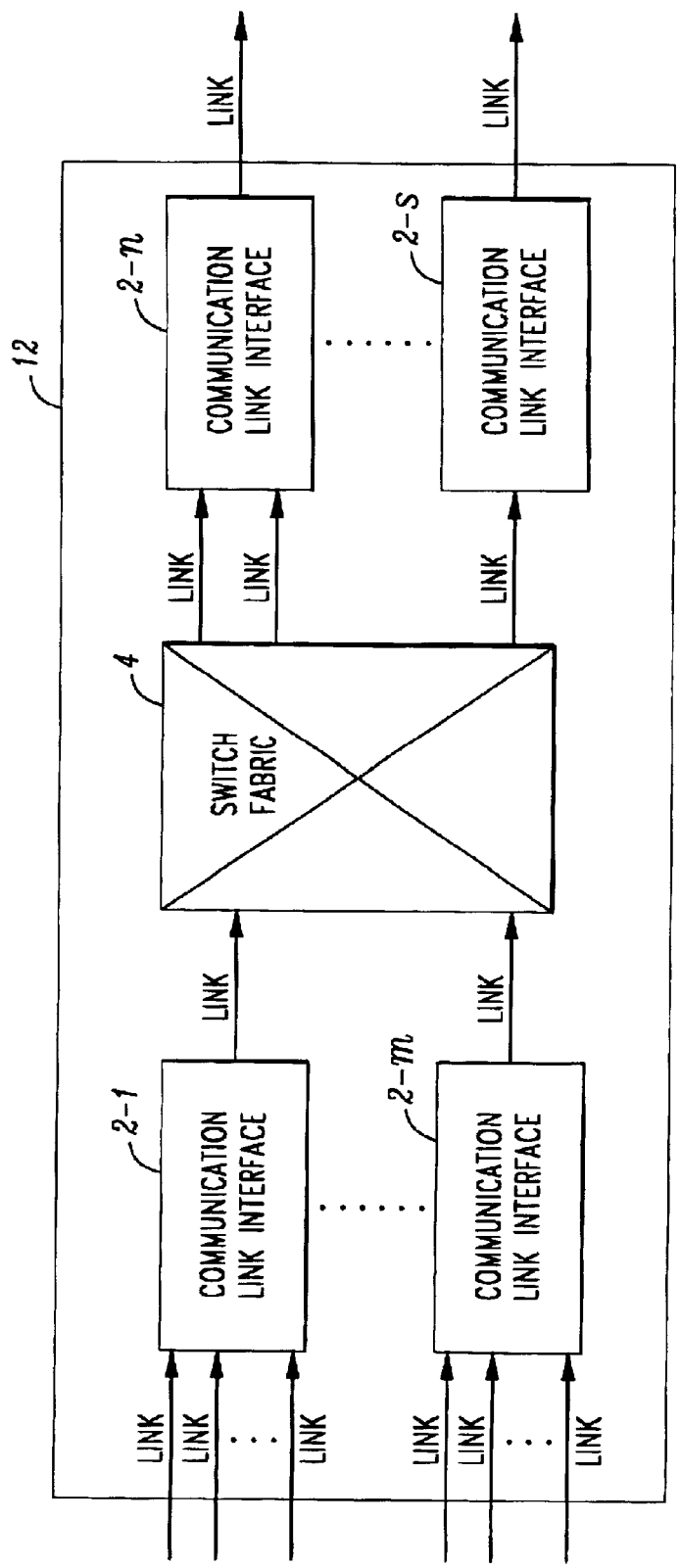
FIG. 2 illustrates an exemplary switch as utilized in a packet communication network.

FIG. 2 contains a diagram of an exemplary communication switch 12, including, among other components, a plurality of communication link interfaces 2-1 through 2-s.

Each of the communication link interfaces, as will be discussed below in association with FIG. 3, connects a plurality of input links to an output link; a communication link interface 2-m receives the data packets associated with corresponding network connections from the input links and transmits them to the output link. As shown in FIG. 2, communication switch 12 may contain one or more communication link interfaces 2. For example, an exemplary communication link interface 2-1 may be located in front of a switch fabric 4, in which case the input links of communication link interface 2-1 may be a plurality of input links of communication switch 12, and the output link of communication link 2-1 connects to switch fabric 4. Alternatively, a communication link interface 2-n may be disposed at the output of switch fabric 4, in which case the input links of communication link interface 2-n may be a plurality of output links of switch fabric 4, and the output link of communication link interface 2-n may be one of the output links of communication switch 12.

Figure 3:
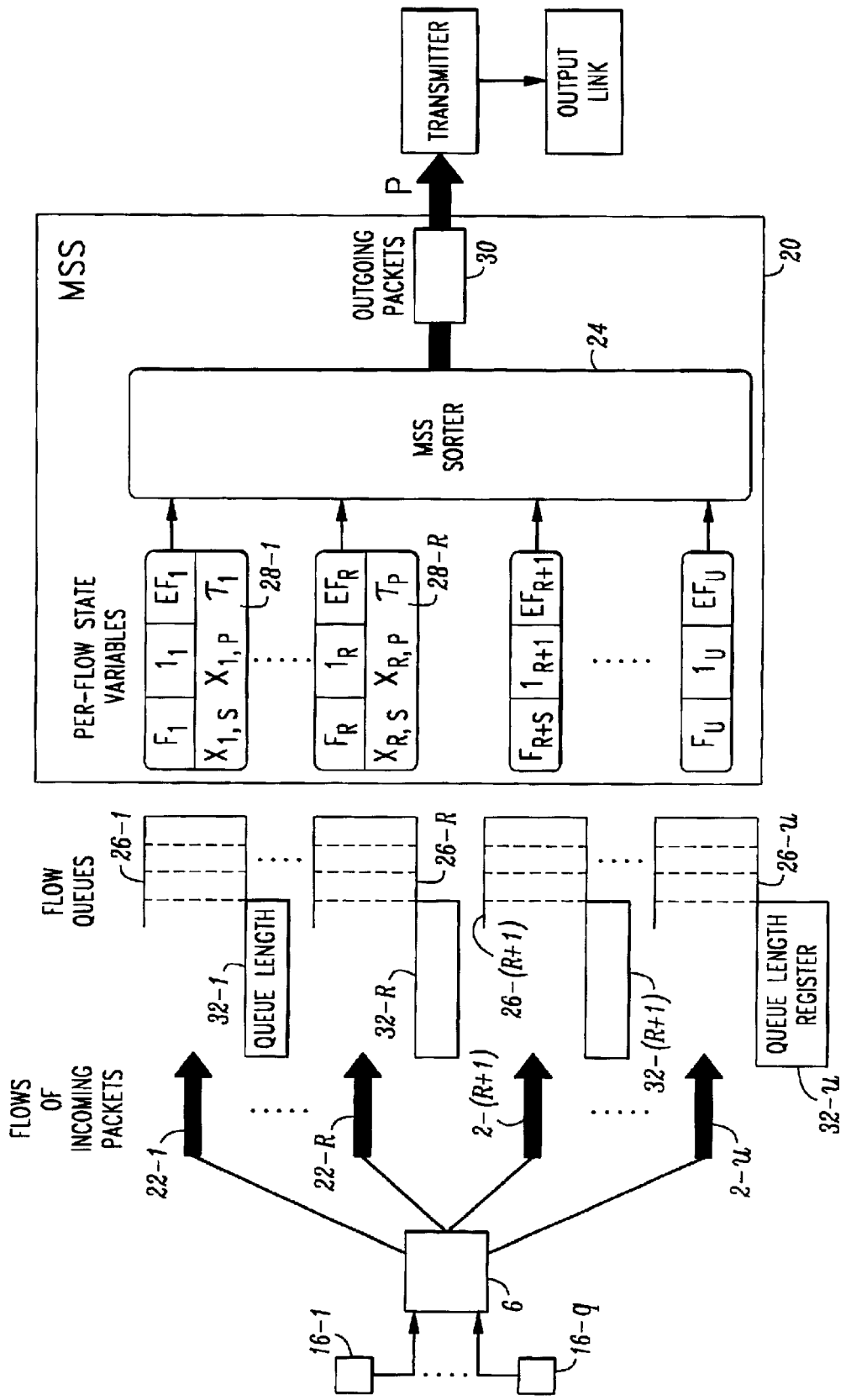
FIG. 3 contains a diagram of an exemplary communication link interface, as utilized within the exemplary switch of FIG. 2, the link interface incorporating the monolithic shaper-scheduler of the present invention.

FIG. 3 illustrates a block diagram of an exemplary communication link interface 2 including a monolithic shaper-scheduler (MSS) 20 formed in accordance with the present invention. Communication link interface 2 includes a data packet receiver 6 which receives the data packets arriving from data sources 16-1 through 16-q. Receiver 6 uses the contents of a connection identifier field included in the header of each packet (not shown) to identify the respective packet flow 22. For each incoming packet, receiver 6 also determines, at the time of receiving the packet, whether or not the packet can be queued in a flow queue 26-i associated with flow 22-i, as identified by the connection-identifier field in the packet header. If the packet can be queued, then receiver 6 stores the packet in flow queue 26-i. A monolithic shaper-scheduler (MSS) 20 defined in accordance with the present invention is included within communication link interface 2, as shown, and is utilized within a communication switch 12 in packet network 10 to distribute service to both shaped flows (i.e., flows for which a traffic profile is specified and dual-leaky-bucket state parameters are defined; designated as shaped flows 22-1 through 22-R in FIG. 3) and unshaped flows (i.e., flows that are not subject to any sort of regulation, and designated as 22-(R+1) through 22-U in FIG. 3. The incoming packets associated with flows 22-1 through 22-U are then held in corresponding queues 26-1 through 26-U, that is, in a separate queue for each flow 22. In the case of shaped flows 22-1 through 22-R, MSS 20 functions to generate a service pattern that complies with the dual-leaky-bucket parameters $B_{I,s}$, $\rho_{I,s}$, $B_{I,p}$, and $\rho_{I,p}$ associated with each flow 22-i, while preserving the latency and minimum-bandwidth guarantees of the flow. For the unshaped flows 22-(R+1) through 22-U, the objective of MSS 20 is limited to the enforcement of the latency and minimum-bandwidth guarantees.

Unlike prior-art schedulers and shapers, MSS 20 of the present invention utilizes a single sorter 24 to process a set of homogeneous timestamps $F_I$ through $F_U$ associated with flows 22-1 through 22-U to form a single outgoing packet stream P. For each packet flow 22-1 through 22-U, inputs to sorter 24 include timestamps $F_1$ through $F_U$, packet lengths $l_1$ through $l_U$, and eligibility flags $EF_1$ through $EF_U$ (as defined below). For each shaped flow 22-i of shaped flows 22-1 through 22-R, MSS 20 includes the above-described leaky-bucket state variables: token levels $X_{I,s}$ and $X_{I,p}$, and update time $\tau_I$. The use of a single sorter 24 alleviates the problems associated with the conventional two-stage, tandem structure present in the shaping multiplexers of the prior art (i.e., a first stage to shape the traffic, and a second stage to multiplex the shaped traffic into an outgoing data packet stream). MSS 20 uses the state-variable values within the traffic regulators 28-1 through 28-R to determine the scheduling behavior (i.e., "work-conserving" vs. "non-work-conserving") that the shaped flows 22-1 through 22-R will experience in the immediate future. However, this information is not used as the essential criteria for computing the timestamps.

Figure 4A:
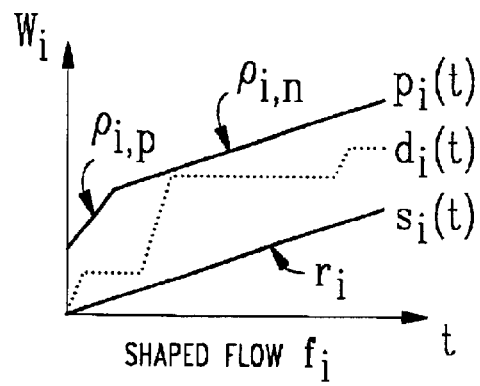
FIG. 4 contains two graphs illustrating exemplary "service", "profile", and "departure" curves for both shaped traffic (FIG. 4A) and unshaped traffic (FIG. 4B)
Figure 4B:
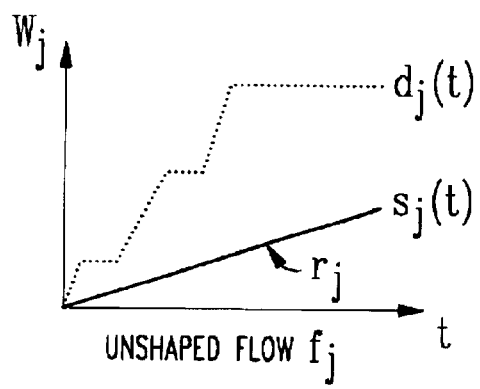

Prior to continuing with a discussion of the shaping architecture specified in the present invention, it is useful to understand the concepts of "service curve", "profile curve", and "departure curve" in the context of scheduling data packets. Reference is made to FIG. 4, which illustrates these concepts for both shaped and unshaped flows. The service curve $s_l(t)$ of a flow 22-i is defined as the minimum amount of service that the scheduler is committed to provide to the flow as long as it remains backlogged. The profile curve $p_l(t)$ of flow 22-i is defined as the maximum amount of service that the flow is allowed to receive from the scheduler. This parameter only applies to shaped flows, since the maximum service for unshaped flows may be infinite. The departure curve $d_l(t)$ plots the actual service received by flow 22-i: it should always lie between the service curve and the profile curve, that is:

$$s_l(t) \leq d_l(t) \leq p_l(t).$$

In the shaping-scheduling methodology of the present invention, the service curve and the profile curve of a flow 22-i are typically defined as distinct entities. In particular, the service curve expresses the minimum-bandwidth and latency guarantees of the flow, and drives the activity of the scheduler. The profile curve, on the other hand, ensures that the outgoing traffic of the flow is contract-compliant by invoking the shaping function whenever a violation of the dual-leaky-bucket parameters is likely to occur.

In order to avoid any behavioral conflict between the scheduling portion of MSS 20 and the dual-leaky-bucket regulators, equality may be imposed between the slope $r_l$ of the service curve of a shaped flow 22-i and the long-term slope $\rho_{l,s}$ of the corresponding dual-leaky-bucket profile. A scheduler that guarantees a minimum service rate $r_l > \rho_{l,s}$ systematically violates the profile curve of flow 22-i; conversely, a flow 22-i that is served at a rate $r_l < \rho_{l,s}$ can only regenerate tokens at the same rate $r_l$, so that $r_l$ (and not $\rho_{l,s}$) becomes the actual long-term slope of the flow's dual-leaky-bucket profile.

The Shaped Virtual Clock (Sh-VC) algorithm of the prior art shapes the configured flows at precisely their allocated service rates. Even if formally correct in terms of worst-case performance indices and compliance with the traffic regulators, the Sh-VC algorithm still shapes all configured flows at exactly their allocated service rates, independently of the actual parameters of the associated traffic regulators (unshaped flows included). Thus, for the purposes of the present invention, the use of the conventional Sh-VC algorithm is not acceptable, since it cannot provide any form of differentiated regulation on a per-flow basis. In accordance with the present invention, therefore, the Sh-VC algorithm is modified to assume a work-conserving behavior whenever backlogged flows with unsaturated leaky buckets are available in the system. This modification restores the capability of differentiating service based on both the allocated scheduling rates and the dual-leaky-bucket parameters of the flows.

Figure 5:
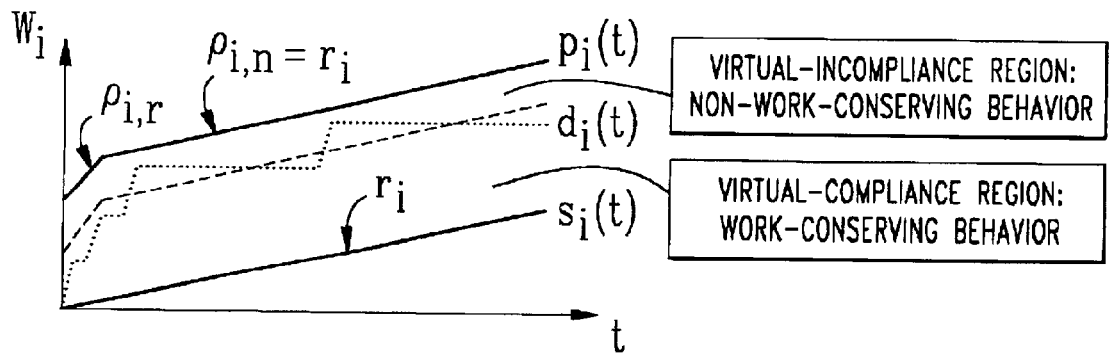
FIG. 5 contains a graph illustrating how scheduling behavior of the MSS adapts to the dual-leaky-bucket status of an exemplary shaped flow.

MSS 20 relaxes the non-work-conserving behavior of the Sh-VC algorithm by allowing in-profile flows to violate the eligibility condition set by the scheduler whenever no "eligible" flows are available. In particular, a shaped flow 22-1 through 22-R is classified as either "virtually compliant" or "virtually incompliant" when a new packet reaches the head of its queue 26-1 through 26-R. MSS sorter 24 checks for "dual-leaky-bucket compliance" of the new packet under the assumption that its transmission starts immediately. If the test for compliance is successful, the flow is classified as "virtually compliant" and the scheduler is enabled to select it for service at any time—even before its eligibility time matures. Alternatively, if the flow is defined as "virtually incompliant", it is forced to receive strict non-work-conserving treatment from the scheduler. FIG. 5 illustrates how the scheduling behavior of MSS 20 adapts to the dual-leaky-bucket status of a shaped flow. When the departure curve $d_l(t)$ of a flow 22-i lies within the virtual-compliance region (below the dashed line in the graph), the flow experiences work-conserving scheduling behavior. However, when $d_l(t)$ enters the virtual-incompliance region (shaded regions above the dashed line), the scheduler becomes non-work-conserving for the flow. Unshaped flows are always classified as "virtually compliant", consistently with their infinite bucket size.

With the exception of one situation that will be discussed in detail below, the timestamp $F_l$ that is assigned to flow 22-i remains the same, regardless of the result of the compliance test. By keeping the underlying Sh-VC algorithm as the driving criterion for computing the timestamps, MSS 20 prevents the accumulation of multiple flows within a narrow range of conformance times from translating into an irreversible increase of transmission delays for some of the colliding flows, and retains the desired latency and fairness properties.

As will be described in detail below, the operation of MSS 20 consists of four basic activities: (1) test for virtual compliance; (2) flow selection; (3) flow dequeue; and (4) flow enqueue. Dual-leaky-bucket regulator 28-i associated with flow 22-i determines the virtual-compliance status of the flow at time $t_{l,h}^k$ when a new packet $p_l^k$ reaches the head of its queue 26-i (for those "shaped" flows 22-1 through 22-R that may be either virtually-compliant or virtually-incompliant). Flow 22-i is defined as "virtually incompliant" if the possibility of a profile violation is detected. Otherwise, the flow is defined as "virtually compliant". In particular, the compliance test evaluates the possibility of violating at least one of the two configured traffic profiles (SBR and PBR) in the case the transmission of the new head-of-the-queue packet starts immediately. Since the transmission of the packet takes at least $l_l^k/r$ time units and increases the SBR and PBR token levels by $l_l^k/\rho_{l,s}$ and $l_l^k/\rho_{l,p}$ units, respectively, a violation of the configured traffic profiles is guaranteed not to occur only if the following inequalities are satisfied at time $t_{l,h}^k$:

$$X_{l,s} \leq B_{l,s} - \left( \frac{l_l^k}{\rho_{l,s}} - \frac{l_l^k}{r} \right)$$

$$X_{l,p} \leq B_{l,p} - \left( \frac{l_l^k}{\rho_{l,p}} - \frac{l_l^k}{r} \right)$$

Flow 22-i is classified as "virtually compliant" if the bounds of the inequalities for both SBR and PBR hold at time $t_{l,h}^k$. Otherwise, the flow is classified as "virtually incompliant".

The second activity of MSS 20, flow selection, begins whenever link server 30 completes a packet transmission, since it is at that time that MSS 20 must select the next packet to transmit. At any time t, the set B(t) of "backlogged" flows is divided into two disjoint and exhaustive subsets: the set C(t) of virtually-compliant flows, and the set I(t) of virtually-incompliant flows, as defined above. Within B(t), the eligibility condition of the Sh-VC algorithm identifies a third subset E(t) of "eligible" flows, where the set E(t) of eligible flows can include members of both C(t) and I(t). In the flow-selection phase, therefore, the scheduler looks first for the minimum eligible timestamp $F_E^{min}$ over all of the backlogged flows:

$$F_E^{min} = \min_{j \in E(t)} F_j$$

If an eligible timestamp is found (meaning that at least one backlogged flow satisfies the eligibility condition of the SEFF packet-selection policy of the Sh-VC algorithm), then the flow $f_E^{min}$ with minimum eligible timestamp $F_E^{min}$ is immediately selected for service. On the other hand, if no eligible flow is available, the scheduler will next search for the flow $f_C^{min}$ with the minimum timestamp $F_C^{min}$ within the subset C(t) of all virtually-compliant flows:

$$F_C^{min} = \min_{j \in C(t)} F_j$$

To summarize the possible outcomes of the flow-selection activity, the scheduler can end up with: (i) the assignment of service to an eligible flow $f_E^{min}$, or (ii) the assignment of service to a virtually-compliant flow $f_C^{min}$, or (iii) no service assignment at all, in the case both E(t) and C(t) are empty.

At time $t_{l,d}^k$, when the link server completes the transmission of packet $p_l^k$ of flow 22-i, the scheduler extracts the flow from the sorting structure and updates its dual-leaky-bucket regulator 28-i. This is referred to as the "flow-dequeue" step in the process. The status update utilizes the length $l_l^k$ of the just-transmitted packet, and must therefore be executed in any case, independently of the state of flow queue 26-i that results from the service (that is, regardless of whether queue 26-i is now empty or still backlogged).

The eligibility status of flow timestamp $F_l^k$ at time $t_{l,d}^k$ determines the value of an "eligibility flag" $EF_l$ associated with the flow and possibly a recalibration of the timestamp itself when the transmission is completed:

```
1    if (F₁ᵏ > t_{l,d}ᵏ + l₁ᵏ/r₁)    /* Timestamp is not eligible */
2        EF₁ ← FALSE
3        F₁ᵏ ← t_{l,d}ᵏ + l₁ᵏ/r₁    /* Recalibration of timestamp */
4    else
5        EF₁ ← TRUE                 /* Timestamp is eligible */
```

When a flow 22-i is defined as "virtually compliant", it can be selected for service even before its eligibility time is reached. In this case, if the new, updated value of the flow timestamp was always derived from the previous value (as in the conventional definition of Sh-VC), the persistent absence of eligible flows could lead to the uncontrollable growth of the distance between the timestamp and the real-time reference. An enventual long-term availability of eligible flows would then lead to a long period of starvation for flow 22-i. This type of behavior, typical of prior-art algorithms, cannot be used in a "shaping" system, where the distribution of service to individual flows is required to be as smooth and regular as possible.

Therefore, in accordance with the present invention, the recalibration rule of line 3 of the above flow-dequeue pseudo-code moves the ineligible timestamp of a virtually-compliant flow back to its eligibility threshold, which is more than satisfactory in terms of controlling the growth of the timestamp without subtracting bandwidth from the other flows. Accordingly, the scheduler executes the instructions of the pseudo-code independently of the state of the flow queue 26-i that results from the transmission.

Last to be considered is the "flow-enqueue" activity. In particular, the scheduler invokes the flow-enqueue activity whenever a new packet $p_l^k$ reaches the head of a flow queue 26-i. That event could be triggered by the arrival of a new packet to an empty flow queue, or by the transmission of a packet from a flow queue 26 that contains at least one more packet. Before computing the new timestamp $F_l^k$ of the flow 22-i being enqucued at time $t_{l,h}^k$, MSS 20 classifies the flow by running the test for virtual compliance on the new head-of-queue packet $p_l^k$. Both the virtual-compliance status and the eligibility flag of the flow contribute to the selection of the rule that updates the flow timestamp, as shown in the following flow-enqueue pseudo-code:

```
1    if (EF₁ = FALSE) and (i ∈ I)
2        F₁ᵏ ← max(F₁ᵏ⁻¹,t_{l,h}ᵏ + l₁ᵏ/r₁) + l₁ᵏ/r₁
3    else if (flow 22-i is newly backlogged)
4        F₁ᵏ ← max(F₁ᵏ⁻¹,t_{l,h}ᵏ) + l₁ᵏ/r₁
5    else
6        F₁ᵏ ← F₁ᵏ⁻¹ + l₁ᵏ/r₁
```

The rules of lines 4 and 6 of the above flow-enqueue pseudo-code reflect the rules for generating and updating the timestamps in accordance with the Sh-VC algorithm. In order to preserve the bandwidth guarantees of a flow 22-i that maintains its virtual-compliance status unchanged, MSS 20 must use the previous timestamp $F_l^{k-1}$ in the computation of the new timestamp $F_l^k$. The value of $F_l^{k-1}$ must also be eligible at time $t_{l,h}^k$, which is guaranteed by the timestamp-recalibration rule of the flow-dequeue activity.

In terms of timestamp maintenance, a significant difference between the monolithic shaper-scheduler of the present invention and the conventional Sh-VC algorithm is highlighted by line 2 of the flow-enqueue pseudo-code. In fact, in accordance with the monolithic shaper-scheduler of the present invention, the shaper slows down the service rate of flow 22-i only if: (1) flow 22-i has already received bandwidth in excess of its allocation (as shown by the "FALSE" value of the eligibility flag, which also implies a previous classification of flow 22-i as virtually compliant); and (2) a violation of the profile of the flow is likely to occur (as detected by the latest test for virtual compliance). The rule of line 2 of the flow-enqueue pseudo-code places the new timestamp $F_l^k$ at no less than two times the service interval $l_l^k/r_l$ of the new head-of-the-queue packet above the current real-time reference. Since, by construction, $r_l=\rho_{l,s} \leq \rho_{l,p}$, the SBR and PBR leaky bickets of flow 22-i have enough time to drain at least as many tokens as they accumulate for the transmission of packet $p_l^k$. In fact, a virtually-incompliant flow 22-i whose timestamp at time t is equal to $(t+2 \cdot l_l^k/r_l)$ must wait at least $l_l^k/r_l$ time units before becoming "eligible" for service. The SBR and PBR buckets are therefore prevented from increasing their levels as a consequence of the next transmission, which preserves the compliance of the flow within the configured traffic profile.

Figure 6A:
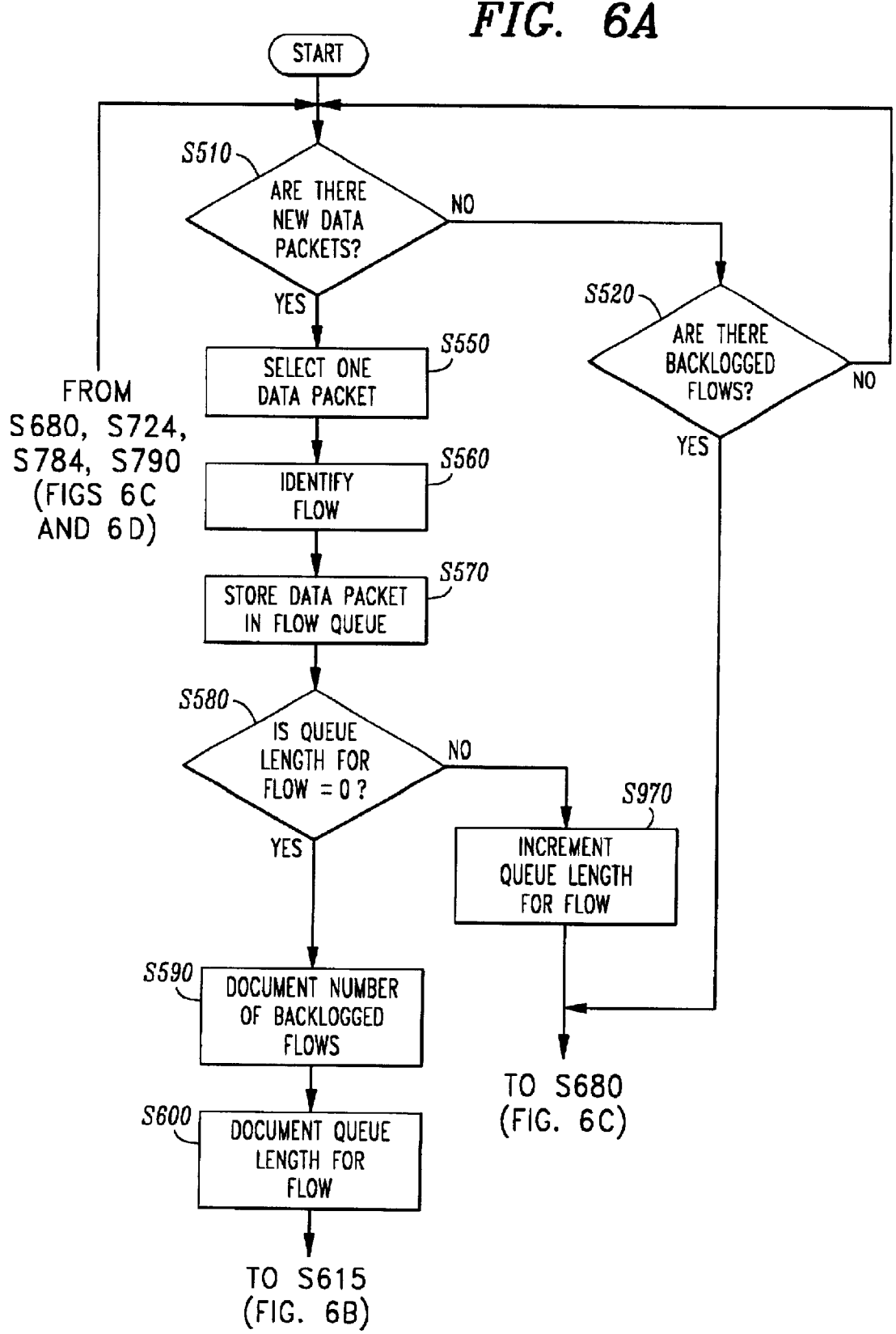
Figure 6D:
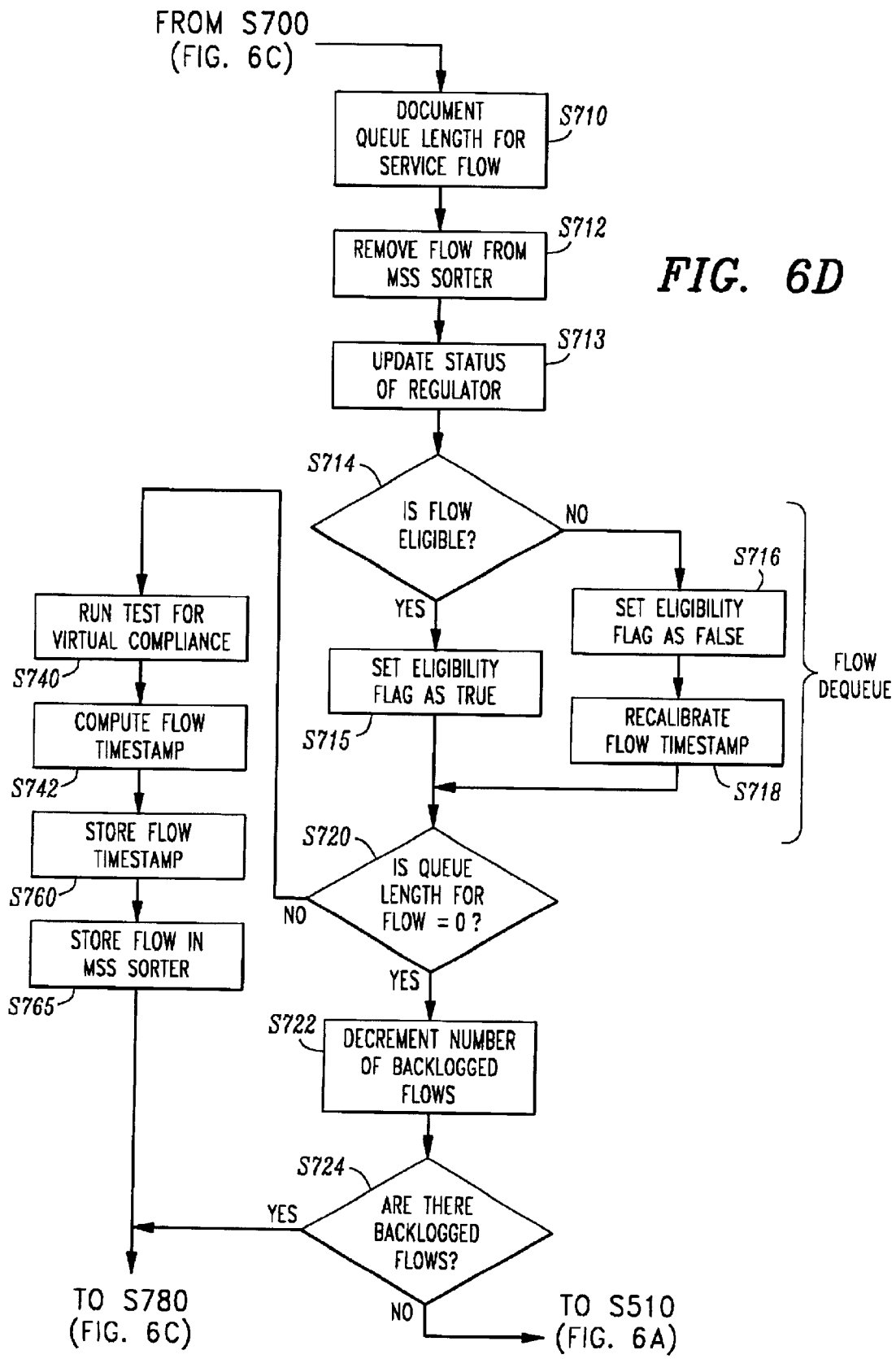

FIGS. 6A–6D, which are arranged relative to one another as shown in FIG. 7, illustrate in flowchart form an illustrative embodiment of the operation of the monolithic shaper-scheduler of the present invention. Referring to FIG. 6A, in step S510, if new data packets have arrived at receiver 6 in communication interface link 2, then MSS 20 proceeds to step S550 to select one of the newly arrived data packets and prepare it for the enqueue operation. If there are no new packets at step S510, MSS 20 proceeds to step S520 to check for the availability of backlogged flows. In S520, if there are no backlogged flows (i.e., B(t)=Ø), the process returns to step S510 and again checks for newly arrived packets. If a backlogged flow is found at step S520, MSS 20 proceeds to step S680.

Returning to step S510, if a new packet is found, step S550 selects for transmission one of the data packets that have just arrived. After selection, the process moves to step S560 which identifies the flow 22-i corresponding to the packet selected in step S550. MSS 20 identifies flow 22-i through a connection identifier contained in the header of the received packet (not shown). The identification of flow 22-i allows for the proper flow queue 26-i to be chosen for storage of the packet (step S570).

In step S580, if the content of queue length register 32-i is 0 (meaning that flow 22-i is not backlogged), MSS 20 proceeds to step S590 and increments the number of backlogged flows. If the content of queue length register 32-i is non-zero, the register 32-i is first incremented by one (step S970) and then the process proceeds to step S680.

In step S600, the queue length 32-i of flow 22-i is incremented by one unit. MSS 20 then proceeds to run the virtual compliance test (step S615) to determine if the arrival of the new packet made flow 22-i "virtually compliant" or "virtually incompliant". The flow timestamp $F_I$ is then computed in step S630 according to the length of the just arrived packet, and stored at step S635 for later retrieval during the sorting process. Once the computation and storage of the timestamp is completed, flow 22-i is stored in MSS sorter 24 (step S640). The timestamp value determines the position of flow 22-i in MSS sorter 24.

In step S680, the availability of the transmitter to send a new packet is checked. If the transmitter is already "busy" in the transmission of another packet, the process will return to step S510, as shown.

If the transmitter is currently not busy in the transmission of a packet, MSS 20 checks in step S700 for the availability of a flow whose state variables still have to be updated (i.e., a flow for which the flow-dequeue operation still has to be executed). If a flow 22-i waiting for the execution of the flow-dequeue procedure does exist, its associated queue length 32-i is first decremented by one unit (step S710). Then, flow 22-i is removed from MSS sorter 24 (step S712), and, if flow 22-i is a "shaped" flow, its associated traffic regulator 28-i is updated to reflect the departure of the last-transmitted packet (step S713). FInally, the eligibility of flow 22-i is ascertained by checking its timestamp, using the relation included in line 1 of the flow-dequeue pseudo-code (step S714). If the flow is "ineligible", the flow-dequeue process is initiated, starting with setting the eligibility flag of the flow ($EF_I$) to "FALSE", and continuing with recalibrating the flow timestamp (based on the equation at line 3 of the flow-dequeue pseudo-code). If, instead, the flow is "eligible", its eligibility flag $EF_I$ is set to "TRUE" (step S715).

Once the flow-dequeue process has been completed and the eligibility flag $EF_I$ has been set to either "FALSE" or "TRUE", the queue length 32-i of flow 22-i is checked (step S720). If the queue length 32-i is zero, the number of backlogged flows is decremented in step S722 and a check is made to determine if there are any remaining backlogged flows in step S724. If all of the backlogged flows have been cleared out, the process returns to the initial step S510 to check for the presence of newly-arrived packets. If backlogged flow remains, as determined in step S724, the process returns to the output from step S700, at the point where it is determined that there are no "serviced flows" available.

At step S720, if it is determined that the flow queue length 32-i is non-zero, the flow-enqueue procedure is executed, starting with running the test for "virtual compliance" of flow 22-i (step S740). Following the determination of either "virtual compliance" or "virtual incompliance", a new timestamp $F_I$ is computed in step S742 (as defined by lines 2, 4, and 6 of the flow-enqueue pseudo-code), depending on the state of the eligibility flag $EF_I$ and on the results of the "compliance" test. The new timestamp $F_I$ is then stored (step S760) and the associated flow 22-i is stored in MSS sorter 24 (step S765).

After storing flow 22-i in MSS sorter 24 at step S765, the process returns to the output of step S700 (similarly to the output from step S724, upon the determination that at least one backlogged flow remained). In step S780, a determination is made if an "eligible flow" is available in MSS sorter 24. If an eligible flow exists, a data packet for that flow is sent to the transmitter (step S790), and the process returns to step S510 to check for newly-arrived packets. If at step S780 it is determined that there is no eligible flow available, a check is made at step S784 to determine if a "compliant" flow is available in MSS sorter 24 (the "eligibility" of the flow is not relevant to its selection). If a compliant flow is available, a packet for that flow is sent to the transmitter (step S790). If no "compliant" flow is found at step S784, the process will, by default, return to the beginning of the process and check for new packet arrivals.

In future high-speed, packet-switched networks, the shaper-scheduler will normally be required to handle a large number N of distinct flows with very diverse bandwidth requirements, and will have to produce a continuous stream of packet selections in front of extremely fast physical interfaces (running, for example, at bit rates in excess of 2.5 Gbps). In this context, the O(logN) algorithmic complexity that is typical of a single, monolithic structure handling the whole set of N timestamps leads to serious scalability problems as N grows to hundreds of thousands, or even millions, of separate flows.

Figure 8:
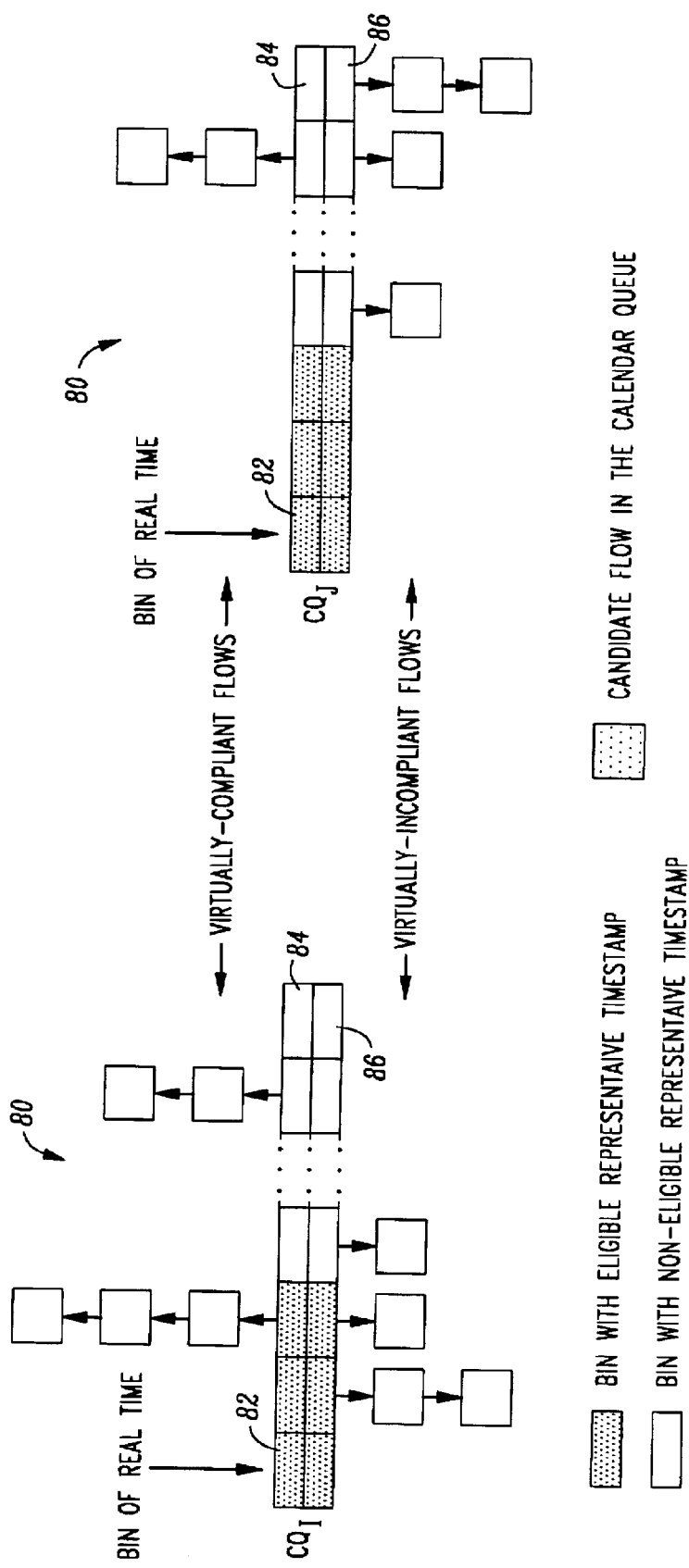
FIG. 8 illustrates two exemplary two-dimensional calendar queues which may be used to simultaneously handle shaped and unshaped traffic in accordance with the present invention.

Under these conditions, a preferred implementation for the monolithic shaper-scheduler of the present invention is the Two-dimensional Calendar Queue (TCQ). The TCQ consists of a set of G calendar queues, each calendar queue being an array of b bins. Two such calendar queues, denoted $CQ_I$ and $CQ_J$, are illustrated in FIG. 8, each including a plurality of bins 80-1 through 80-M. Each bin 80-i is associated with a certain range of timestamp values. The width of the timestamp range associated with an exemplary bin 80-i is defined as the "bin granularity" of the calendar queue, while the lower end of the timestamp range associated with a bin 80-i is defined as the "representative timestamp" of the bin. In each calendar queue $CQ_I$, as shown in FIG. 8, the bins are ordered by increasing values of their representative timestamps. Flow pointers 82 are queued to bins 80 based on the current timestamps of the flows. Bins 80 are then visited in their order in memory. Within each bin, the service policy may be either LIFO or FIFO.

In the TCQ as used in the present invention, distinct calendar queues are used to segregate flows whose head-of-the-queue packets have different "service intervals", where, as defined above, the service interval $\Phi_I^k$ of packet $p_I^k$ of flow 22-i is equal to $l_I^k/r_I$. Each calendar queue $CQ_I$ is associated with a reference service interval $\Phi_I$, with a constant ratio $\Delta g$ imposed between adjacent intervals. That is:

$$\Phi_{I+1} = \Delta g \cdot \Phi_I.$$

Each bin 80 in a calendar queue $CQ_I$ covers a certain range $\delta F_I$ of timestamp values (or "bin granularity"), which depends on the total range $\Delta F_I$ covered by the calendar queue and on the number b of bins in the calendar queue:

$$\delta F_I = \frac{\Delta F_I}{b}.$$

In order to prevent the finite representation of the timestamps from inducing the overlapping of disjoint intervals of timestamp values into the same bin of calendar queue $CQ_I$, the following lower bound on the range of timestamp values covered by $CQ_I$ must hold:

$$\Delta F_I > \Phi_I \cdot \frac{L_{max}}{L_{min}},$$

where $L_{max}$ and $L_{min}$ are the maximum and minimum packet size in the system, respectively.

When flow 22-i finds a new packet $p_I^k$ at the head of its queue 26-i, MSS 20 computes the corresponding service interval $\Phi_I^k$, and uses its value to identify the index I of the destination calendar queue for the flow:

$$I = \left\lfloor \log_{\Delta g}\left(\frac{\Phi_I^k}{\Phi_{min}}\right) \right\rfloor + 1,$$

where $\Phi_{min} = L_{min}/r_{max}$ is the minimum service interval that can be found in the system. In accordance with the above relation, therefore, all backlogged flows with a current service interval that is greater than $\Phi_{I-1}$ and not greater than $\Phi_I$ will be queued in $CQ_I$.

After determining the destination calendar queue and the virtual-compliance status of flow 22-i, MSS 20 computes the new timestamp $F_I^k$ of flow 22-i based on the flow-enqueue pseudo-code. The just-computed timestamp drives the identification of the destination bin in the calendar queue. Referring again to FIG. 8, MSS 20 of the present invention maintains two linked lists of flows, denoted 84 and 86, in each bin 80. The two linked lists allow separate access to flows having similar timestamps but opposite virtual-compliance status (i.e., "virtually compliant" and "virtually incompliant"). At any time, the calendar queue is labeled with two timestamp values: a minimum eligible timestamp $F_{I,E}^{min}$ and a minimum "virtually-compliant" timestamp $F_{I,C}^{min}$. In particular, $F_{I,E}^{min}$ is the representative timestamp of the first backlogged bin in the calendar queue, if the value satisfies the eligibility condition. The reference service interval $\Phi_I$ of $CQ_I$ is used in the eligibility test, so that $F_{I,E}^{min}$ satisfies the following condition at time $t_{I,E}$:

$$F_{I,E}^{min} \leq t_{I,E} + \Phi_I.$$

If the representative timestamp of the first non-empty bin is not eligible, then $F_{I,E}^{min}$ is void.

Timestamp $F_{I,C}^{min}$ is the representative timestamp of the first bin whose list of "virtually-compliant" flows is not empty (i.e., $F_{I,C}^{min} \geq F_{I,E}^{min}$ when both $E_I$ and $C_I$ are not empty).

Every time link server 30 is available for the transmission of a new packet, MSS 20 looks for the minimum value of $F_{I,E}$ over all calendar queues $CQ_I$. If such a value is found, the first flow in the corresponding bin is selected for service (in case both linked lists in the bin are backlogged, the list of virtually-incompliant flows is given priority, in order to help virtually-compliant flows in preserving their status).

Otherwise, the scheduler looks for the calendar queue $CQ_I$ whose timestamp $F_{I,C}$ is minimum, and selects the corresponding virtually-compliant flow for service.

The illustrative embodiments described above are but exemplary of the principles that may be used to shape and schedule packet data traffic in accordance with the present invention. Those skilled in the art will be able to devise numerous arrangements which, although not explicitly shown or described herein, nevertheless embody those principles that are within the spirit and scope of the present invention as defined by the claims appended hereto.

What is claimed is:

1. In a packet-switched communication system including a plurality of data sources and a plurality of destinations, interconnected by a plurality of communication switches, an integrated shaping-scheduling mechanism responsive to shaped packet flows from a first set of data sources and to unshaped packet flows from a second set of data sources, for providing a single, multiplexed output flow of data packets from both the first and the second set of sources, the mechanism comprising:

a receiver for organizing incoming packets from said plurality of data sources into a plurality of predetermined flow queues, a first partition of flow queues corresponding to shaped packet flows and a second partition of flow queues corresponding to unshaped packet flows, each shaped packet flow being associated with a separate traffic profile, said traffic profile being defined as means for expressing upper limits on the amount of data packets that the packet communication system is allowed to transmit for an associated shaped packet flow;

a plurality of traffic regulators, each traffic regulator being used for determining whether a corresponding flow is classified as either "virtually compliant" or "virtually incompliant", where all unshaped flows are always virtually compliant, and shaped flows are virtually compliant as long as their traffic profiles are not close to be violated, and virtually incompliant when their traffic profiles are close to be violated;

a selector for determining the order of transmission of data packets associated with packet flows, the activity of the selector being driven by the values of a plurality of state variables associated with the packet flows;

a flow-dequeue element for removing a just-transmitted packet from its queue and modifying one or more of said plurality of state variables associated with that queue; and a flow-enqueue element for updating one or more of said plurality of state variables when a new packet reaches the head of one of a plurality of packet queues, each of said packet queues being associated with a respective packet flow.

2. A packet-switched communication system as defined in claim 1, wherein the traffic profile of a shaped flow $f_I$ is expressed by a set of dual-leaky-bucket traffic-regulator parameters, said dual-leaky-bucket traffic-regulator parameters being called a sustainable-bit-rate (SBR) bucket size $B_{I,s}$, a sustainable-bit-rate token rate $\rho_{I,s}$, a peak-bit-rate (PBR) bucket size $B_{I,p}$, and a peak-bit-rate token rate $\rho_{I,p}$.

3. A packet-switched communication system as defined in claim 2, wherein the status of virtual compliance of a packet flow $f_I$ is determined by comparison of said dual-leaky-bucket traffic-regulator parameters with a plurality of associated state variables, said state variables being called token levels $X_{I,s}$ and $X_{I,p}$, and time of latest update $\tau_I$.

4. A packet-switched communication system as defined in claim 3, wherein the selector determines the virtually-compliant versus virtually-incompliant status of a packet flow $f_l$ using the following test:

$$X_{l,p} \leq B_{l,p} - \left(\frac{l_l^k}{\rho_{l,p}} - \frac{l_l^k}{r}\right)$$

$$X_{l,s} \leq B_{l,s} - \left(\frac{l_l^k}{\rho_{l,s}} - \frac{l_l^k}{r}\right)$$

wherein $l_l^k$ is the length of the data packet currently located at the head of the packet queue associated with the packet flow being tested, said data packet being referred to as the head-of-the-queue packet of said packet queue, and r is the total transmission capacity of the server, the packet flow being classified as "virtually compliant" as long as both inequalities are satisfied, and as "virtually incompliant" otherwise.

5. A packet-switched communication system as defined in claim 1, wherein the selector determines the next packet to be transmitted by first searching for eligible packet flows and transmitting a packet from a queue associated with one of such eligible packet flows if any is found, and if no eligible packet flow is found, the selector determines the next packet to be transmitted by searching for a virtually-compliant packet flow and transmitting a packet from a queue associated with one of such virtually-compliant packet flows if any is found, and if no virtually-compliant packet flow is found the selector determines no packet transmission.

6. A packet-switched communication system as defined in claim 5, wherein a timestamp is associated with each of a plurality of packet flows, each timestamp being used in the determination of the eligibility and virtual-compliance status of the associated packet flow and in the determination of the order of transmission of packets.

7. A packet-switched communication system as defined in claim 6, wherein the eligibility of a packet flow is determined by checking the associated timestamp in accordance with a Smallest Eligible Finishing time First (SEFF) packet-selection policy.

8. A packet-switched communication system as defined in claim 7, wherein the flow-dequeue element modifies the state variables associated with the packet queue of the packet flow of a just-transmitted packet with the assessment of a new eligibility status of the packet flow and the consequent setting of an "eligibility flag" associated with the packet flow.

9. A packet-switched communication system as defined in claim 8, wherein a timestamp is recalibrated by the flow-dequeue element if a data packet has just been transmitted from the packet queue of the associated packet flow and the current value of said timestamp is greater than the current "real" time plus the service interval of the just transmitted packet, the recalibrated timestamp being equal to the sum of the "real" time plus the service interval of the just transmitted packet, said service interval being equal to the ratio between the length of the just transmitted packet and the guaranteed service rate of the packet flow of the just transmitted packet.

10. A packet-switched communication system as defined in claim 8, wherein the flow-enqueue element uses the result of the virtual-compliance test applied to the packet flow being processed and the current value of the eligibility flag of said packet flow to compute a value for the timestamp associated with said packet flow.

11. A packet-switched communication system as defined in claim 10, wherein if the value in the eligibility flag is "FALSE" and the associated packet flow is virtually incompliant, the generated timestamp is the maximum of either the previous timestamp or the current "real" time plus the service interval of the head-of-the-queue packet of said packet flow, with said service interval being added to said maximum.

12. A packet-switched communication system as defined in claim 10, wherein if the head-of-queue packet of a packet flow is a newly-arrived packet, the generated timestamp is the maximum of either the previous timestamp of the packet flow or the current "real" time, with the value of the service interval of the head-of-the-queue packet being added to said maximum.

13. A packet-switched communication system as defined in claim 10, wherein if the packet flow is virtually-compliant and its head-of-the-queue packet did not just arrive to the queue, the generated timestamp is equal to the previous timestamp of the packet flow plus the service interval of the head-of-the-queue packet.

14. A method of scheduling service over a plurality of queues holding flows of packet data traffic, the method integrating shaping of packet flows and scheduling of both shaped and unshaped packet flows and defined by the steps of:

responsive to receiving a plurality of data packets from a plurality of data sources, identifying for each receiving data packet a respective queue for storage of said data packet;

storing each received data packet in its identified queue;

determining, for each shaped packet flow, a set of traffic-regulator parameters associated with a traffic profile of said packet flow;

for each packet flow, performing a "virtual-compliance" test every time a new packet reaches the head of the corresponding flow queue, wherein each unshaped flow is predetermined as being always classified as virtually compliant, and each shaped flow is determined to be classified as virtually compliant as long as the size of its head-of-queue packet does not create the possibility of violating the predetermined traffic-regulator parameters;

selecting a packet for transmission from among eligible packet flows and virtually-compliant packet flows, therefore always excluding from the selection data packets of packet flows that are both non-eligible and virtually-incompliant;

performing a flow-dequeue process subsequent to data packet transmission for recalibrating a plurality of state variables associated with the packet queue of the packet flow of the just transmitted data packet; and performing a flow-enqueue process upon every arrival of a new packet to the head of a corresponding flow queue.

15. The method as defined in claim 14, wherein the traffic regulators are defined by dual-leaky-bucket parameters for a sustainable-bit-rate (SBR) leaky bucket and a peak-bit-rate (PBR) leaky bucket, and include for each leaky bucket a first state variable X that defines the number of tokens in the bucket, and a second state variable $\tau$ that expresses the time when the number of tokens was last updated.

16. The method according to claim 15, wherein the test for virtual compliance is based on the verification of the following inequalities:

$$X_{l,p} \leq B_{l,p} - \left(\frac{l_l^k}{\rho_{l,p}} - \frac{l_l^k}{r}\right)$$

$$X_{l,s} \leq B_{l,s} - \left(\frac{l_l^k}{\rho_{l,s}} - \frac{l_l^k}{r}\right)$$

wherein $B_{l,s}$ and $B_{l,p}$ are the "bucket sizes" for the two leaky buckets of the packet flow being tested, $l_l^k$ is the length of the head-of-the-queue packet of said packet flow, $\rho_{l,s}$ and $\rho_{l,p}$ are the token rates of the two leaky buckets, and r is the total transmission capacity of the server, the packet flow being defined as "virtually compliant" as long as both inequalities are satisfied.

17. The method according to claim 14, wherein in determining the order of packets to be transmitted, the following steps are used:

searching for an eligible packet flow, and selecting an eligible packet flow with the shortest time before expiration of the transmission deadline for its head-of-the-queue packet, said transmission deadline being expressed by a timestamp associated with said packet flow; if no such eligible packet flow exists, then searching for a virtually-compliant packet flow, and selecting a virtually-compliant packet flow with the shortest time before expiration of the transmission deadline for its head-of-the-queue packet; if no such virtually-compliant packet flow exists, then not selecting any packet for transmission at that time.

18. The method according to claim 14, wherein the eligibility of a packet flow is determined in accordance with a Smallest Eligible Finishing time First (SEFF) packet-selection policy.

19. The method according to claim 18, wherein in performing the flow-dequeue process for a packet flow $f_l$, the following steps are executed to determine the value of an eligibility flag $EF_l$ and possibly recalibrate the timestamp $F_l^k$ of the packet flow:

| | | |
|---|---|---|
| 1 | if ($F_l^k > t_{l,d}^k + l_l^k/r_l$) | /* Timestamp is not eligible */ |
| 2 | $\quad EF_l \leftarrow$ FALSE | |
| 3 | $\quad F_l^k \leftarrow t_{l,d}^k + l_l^k/r_l$ | /* Recalibration of timestamp */ |
| 4 | else | |
| 5 | $\quad EF_l \leftarrow$ TRUE | /* Timestamp is eligible */ | where $t_{l,d}^k$ is the current "real" time.

20. The method according to claim 19, wherein in performing the flow-enqueue process for a packet flow $f_l$, the following steps are executed:

| | |
|---|---|
| 1 | if ($EF_l$ = FALSE) and (i $\in$ I) |
| 2 | $\quad F_l^k \leftarrow \max(F_l^{k-1}, t_{l,n}^k + l_l^k/r_l) + l_l^k/r_l$ |
| 3 | else if (flow 22-i is newly backlogged) |
| 4 | $\quad F_l^k \leftarrow \max(F_l^{k-1}, t_{l,n}^k) + l_l^k/r_l$ |
| 5 | else |
| 6 | $\quad F_l^k \leftarrow F_l^{k-1} + l_l^k/r_l$ | where I is defined as the set of virtually-incompliant packet flows.

* * * * *